United States Patent [19]

Okubo et al.

[11] 4,275,614
[45] Jun. 30, 1981

[54] APPARATUS FOR PREVENTING WRONG SHIFT OPERATION IN SPEED CHANGE GEAR FOR VEHICLE

[75] Inventors: Kiyokazu Okubo, Wako; Hiroshi Nakayama, Kamifukuoka, both of Japan

[73] Assignee: Honda Giken Kogyo Kabushiki Kaisha, Tokyo, Japan

[21] Appl. No.: 100,875

[22] Filed: Dec. 6, 1979

[30] Foreign Application Priority Data

Dec. 12, 1978 [JP] Japan .................. 53/169833[U]
Dec. 12, 1978 [JP] Japan .................. 53/169834[U]
Dec. 12, 1978 [JP] Japan .................. 53/169835[U]

[51] Int. Cl.³ .................. G05G 5/04; G05G 9/18
[52] U.S. Cl. .................. 74/476; 267/150
[58] Field of Search .......... 74/473 R, 476; 267/150

[56] References Cited

U.S. PATENT DOCUMENTS

| | | | |
|---|---|---|---|
| 1,250,355 | 12/1917 | Robinson et al. | 74/476 |
| 3,933,057 | 1/1976 | Tsuzuki et al. | 74/476 |
| 3,939,724 | 2/1976 | Takahashi et al. | 74/476 |
| 4,137,792 | 2/1979 | Cellano | 74/476 X |

FOREIGN PATENT DOCUMENTS

874253  4/1953  Fed. Rep. of Germany .
52-17229  5/1977  Japan .

*Primary Examiner*—Allan D. Herrmann
*Attorney, Agent, or Firm*—Haseltine and Lake

[57] ABSTRACT

A shifting apparatus for a transmission of a vehicle comprising a shift lever operable left and right for travel to selection positions and front and rear for shifting gears, the shift lever being shiftable in one of the selection positions between a forward gear position and a reverse gear position. A projection is movable with the shift lever vertically in the selection operation and horizontally in the shift operation. A pivotable lock member is positioned in the vertical path of travel of the projection and the lock member and projection are provided with cam surfaces such that the lock member is pivoted, when the projection is moved, from a neutral position to an inoperative position. The lock member is held in its neutral position by a spring and in the inoperative position the shift lever is movable to the forward gear position and to the reverse gear position. When the projection is moved to the selection position, the cam surfaces are cooperatively engaged to pivotably move the lock member to its inoperative position and if the shift lever should then be moved to the forward gear position, the lock member is then pivotably moved by the spring to its neutral position at which any movement of the shift lever to the reverse gear position will cause the projection to engage a claw on the lock member. A stop member is fixed in the path of travel of the lock member to prevent pivotal movement of the lock member in this position and thereby prevent travel of the shift lever to the reverse gear position.

10 Claims, 19 Drawing Figures

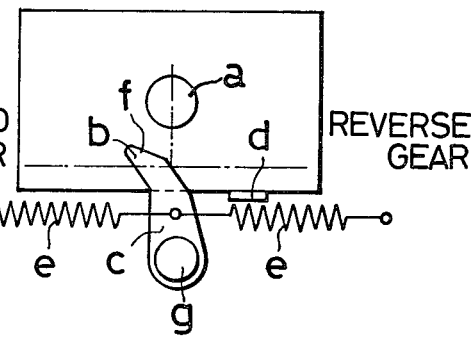
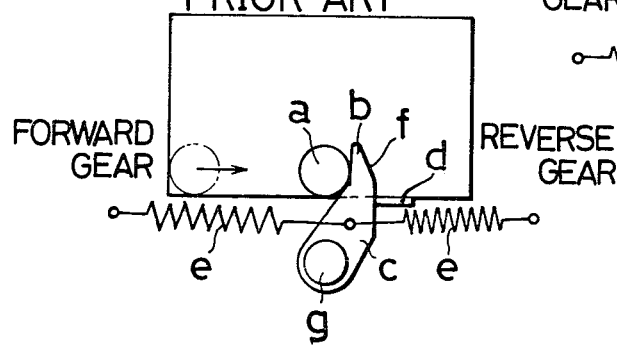
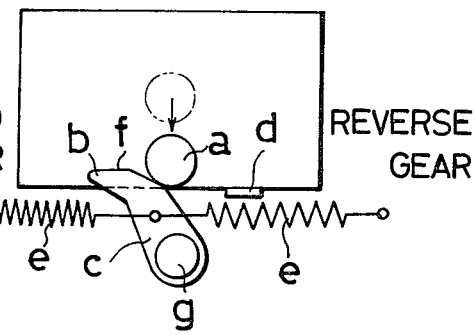
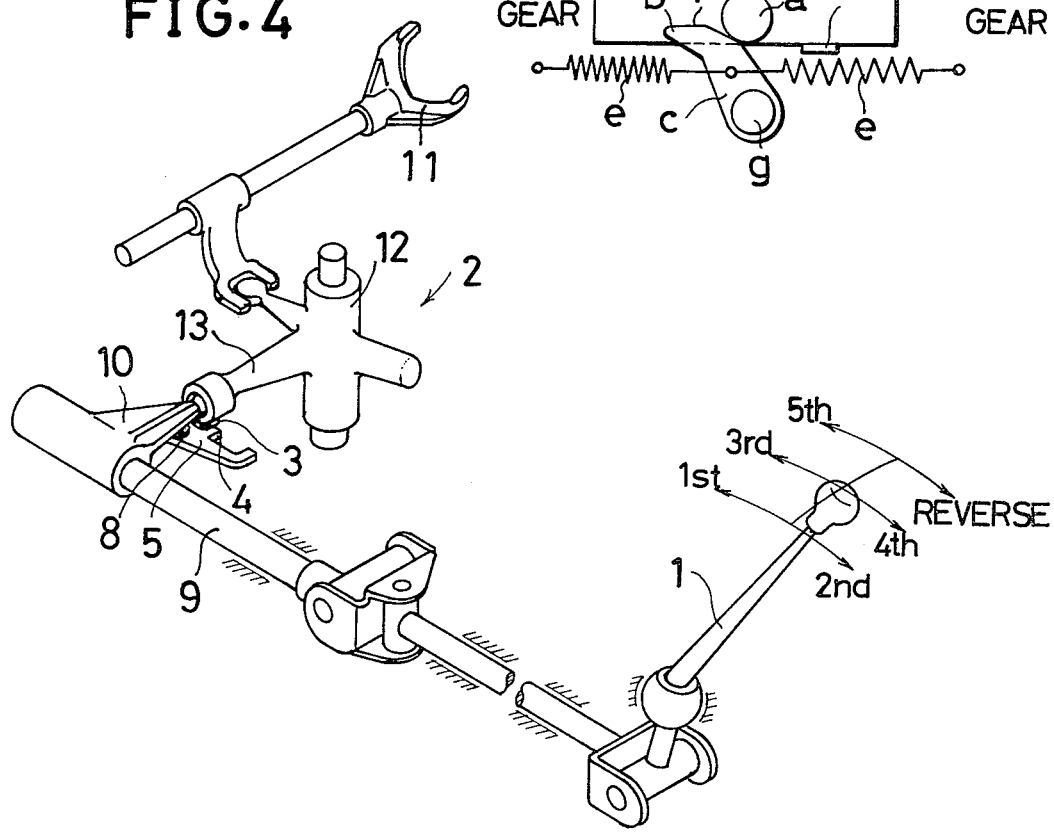

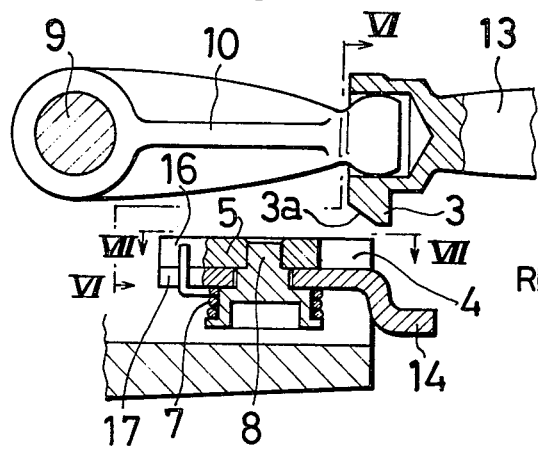
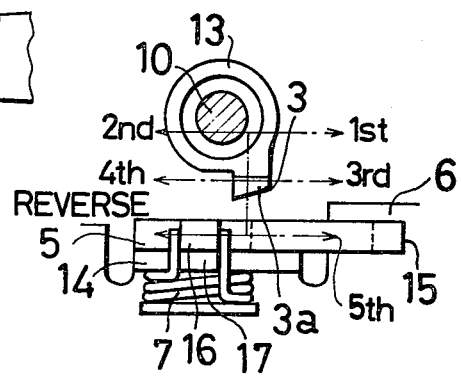
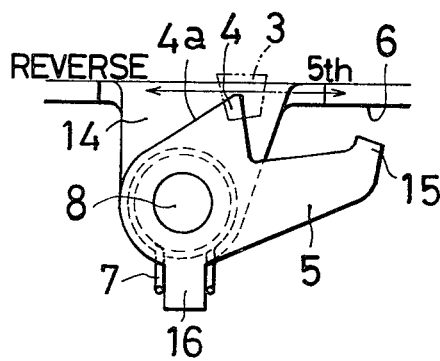
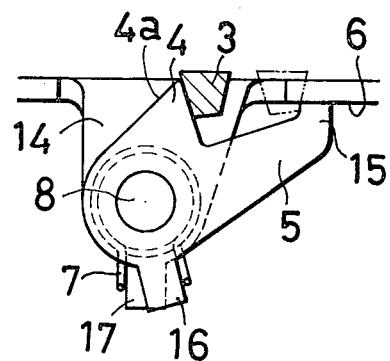
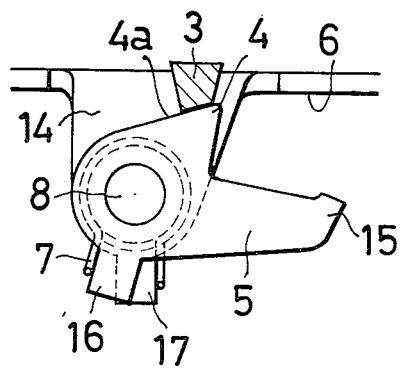
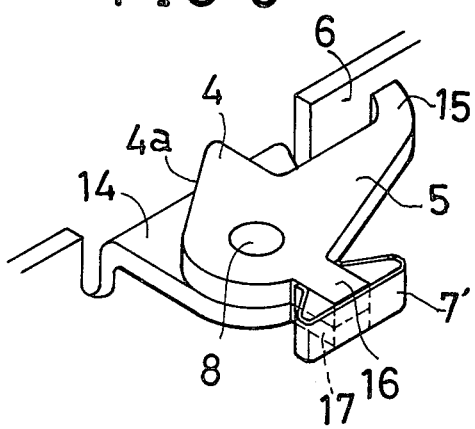

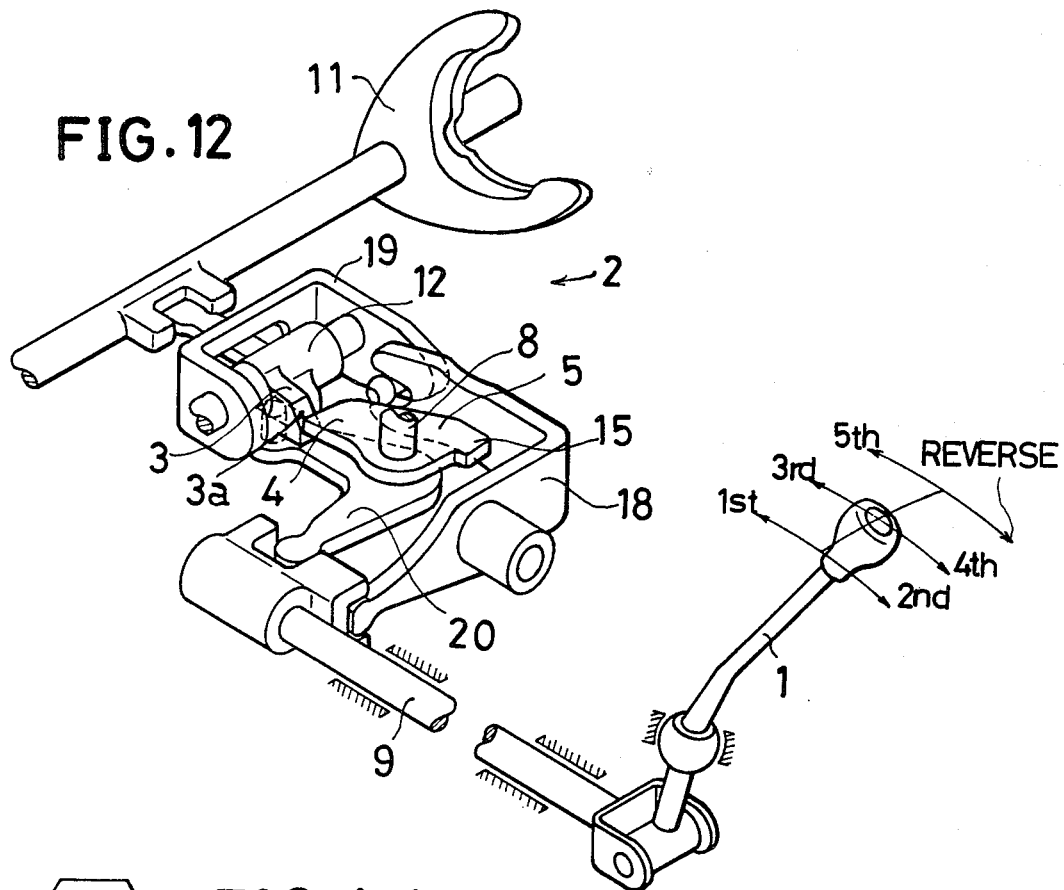
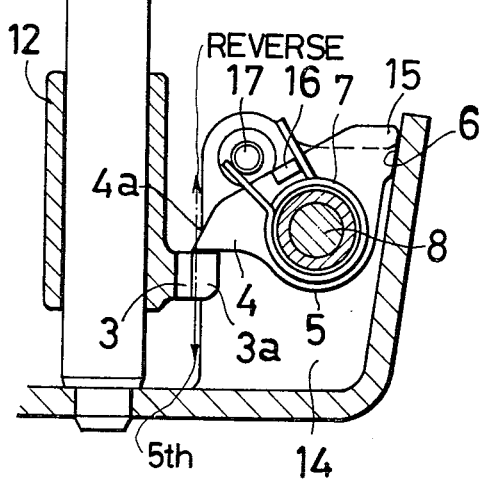
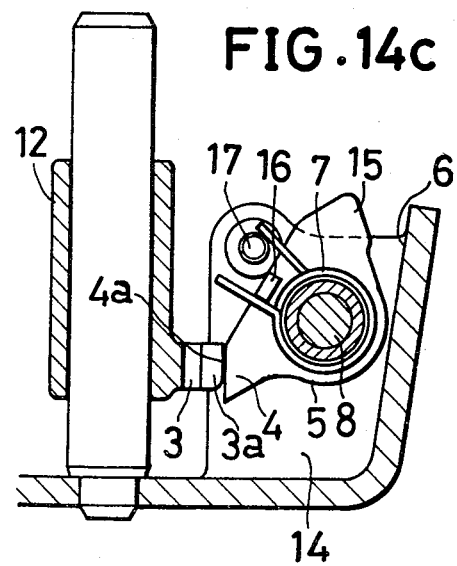

APPARATUS FOR PREVENTING WRONG SHIFT OPERATION IN SPEED CHANGE GEAR FOR VEHICLE

FIELD OF THE INVENTION

This invention relates to apparatus for preventing an incorrect shift operation in a manual transmission of a vehicle, such as a motorcar or the like.

PRIOR ART

In a transmission having a shift lever which is adapted to be operated for selection of the gears, the shift lever is movable from its neutral position left and right to selection positions on either side of the neutral position and then front and back in each of the selection positions. In one selection position, the shift lever is movable between a forward gear position and a reverse gear position. In general, there is danger that, when the shift lever is to be returned from the forward gear position to the neutral position, the shift lever is inadvertently shifted to the reverse gear position which is disposed on the same shift-operation path and thereby the gears of the speed change gear can be damaged.

In order to prevent such an improper operation, there is known an apparatus of the type as shown in FIG. 1. Therein, a lock member c has at its outer end an engaging claw b positioned in the shift-operation path of a projection a connected to the shift lever. The lock member c is pivotally mounted so as to be movable against the action of a return spring e from an intermediate neutral position (FIG. 1) to a lock position (FIG. 2) preventing reverse gear engagement at which lock position, the member c abuts a stop member d and to a forward gear inoperative position at which the engaging claw b is retracted out of the shift-operation path so that when the shift lever is shift-operated from the forward gear position towards the reverse gear position, as shown in FIG. 2, the projection a is brought into engagement with the engaging claw b and thereby the lock member c is given a pivotal movement to the lock position at which the shift operation of the shift lever to the reverse gear position is prevented. In this arrangement, when the projection a is brought into abutment with a cam edge f on the outer surface of the engaging claw b as shown in FIG. 3, by the selection of the shift lever to the selection position, the lock member c is pivotably moved to the inoperative position at which the shift operations of the shift lever to the forward gear position and to the reverse gear position are permitted. The lock member c is disposed on an extension line of the selection operation path of the projection a and is pivotally supported by a pivot g extending along that path at right angles therewith. Consequently, there is the disadvantage that the apparatus must increase in size in the direction of the selection operation path, and especially in the case in which the apparatus is contained in the lower portion of a transmission casing in a FF type motorcar, the selection operation path of the projection a is usually oriented in the vertical direction and, as a result, the apparatus is increased in length in the vertical direction. Thus, the transmission casing is enlarged downwards and the ground clearance of the motorcar is decreased. In addition, the lock member c is so arranged that, when the shift operation is completed, the lock member is returned to its neutral position by the return spring e as a result of disengagement of the projection a from the engaging claw b and is ready for the return operation from the forward gear position. It has been usual in this case that the return spring e comprises one pair of springs for pulling the lock member c towards the forward gear side and towards the reverse gear side, respectively, so that the lock member c may be kept in its neutral position due to a balance between the two springs. This arrangement, however, has the disadvantage that frequently the lock member c can not be kept in its predetermined neutral position due to unbalance produced by friction acting on the lock member c or a change in the resilient force of the respective springs e, and if a deviation of the lock member c towards the forward gear side occurs, the projection a can not be brought into engagement with the engaging claw b on the return operation from the forward gear position and as a result an incorrect operation of the shift lever to the reverse gear position can not be prevented, whereas if a deviation of the lock member c towards the reverse gear side occurs when a shift operation to the reverse gear position is effected following the selection operation, the projection a is brought into engagement with the engaging claw b and as a result, the shift operation to the reverse gear position becomes impossible.

SUMMARY OF THE INVENTION

An object of the invention is to provide an apparatus free from the foregoing disadvantages.

In accordance with the invention, a shift lever of a transmission is adapted to be manually operated for movement from a neutral position left and right to selection positions on either side of the neutral position and then be operated front and back for shifting in the selection position. In one of the selection positions, the shift lever is movable front and rear between a forward gear position and a reverse gear position. The transmission is provided with a lock member having at its outer end an engaging claw projecting within the path of travel of a projection connected to the shift lever such that the lock member can be pivoted against the action of a return spring from an intermediate neutral position to a reverse gear side lock position at which it is restricted by a stop member and to a forward gear side inoperative position at which the engaging claw is retracted out of the shift operation path so that when the shift lever is shift-operated from the forward gear position towards the reverse gear position, the projection is brought into engagement with the engaging claw and the lock member is given a pivotal movement to the lock position for preventing the shift lever from traveling to the reverse gear position. The invention is characterized in that the lock member is supported by a pivot which is disposed parallel to the selection operation path of travel of the projection so as to be in an attitude extending across this path at right angles therewith, and the projection is formed, at its top portion, with a cam surface which, when the shift lever is selection-operated to the selection position, is brought into abutment with a cam edge formed on the outer edge of the engaging claw and thereby the locking member is pivoted to said inoperative position at which both the shift operations of the shift lever to the forward gear position and to the reverse gear position are permitted.

According to a feature of this invention, the return spring is so constructed that, at the neutral position of the lock member, the spring is in pressure contact from both sides with a projection provided on the lock member and a spring receiving member provided on a machine frame.

According to a further feature of this invention, the return spring comprises a comparatively strong first spring portion which is in abutment with the lock member in order to urge the same pivotably in one direction and a comparatively weak second spring portion which is in abutment with the lock member 5 in order to urge the lock member pivotably in the other direction, and there is provided a spring member fixed to the machine frame and serving to receive the resilient force of the first spring portion at the neutral position of the lock member.

BRIEF DESCRIPTION OF THE SEVERAL VIEWS OF THE DRAWING

FIGS. 1 to 3 are side views diagrammatically showing the operation of a conventional apparatus.

FIG. 4 is a perspective view of one embodiment of the apparatus according to the invention.

FIG. 5 is a sectional view taken through the embodiment in FIG. 4.

FIG. 6 is a sectional view taken along line VI—VI in FIG. 5.

FIGS. 7a, 7b and 7c are sectional views taken along line VII—VII in FIG. 5 in various stages of operation.

FIG. 8 is a perspective view of a modification of a portion of the apparatus.

FIG. 12 is a perspective view of another embodiment of the apparatus according to the invention.

FIGS. 14a, 14b and 14c are sectional views taken along line XIV—XIV in FIG. 13 in various stages of operation.

DETAILED DESCRIPTION

Figure 9:
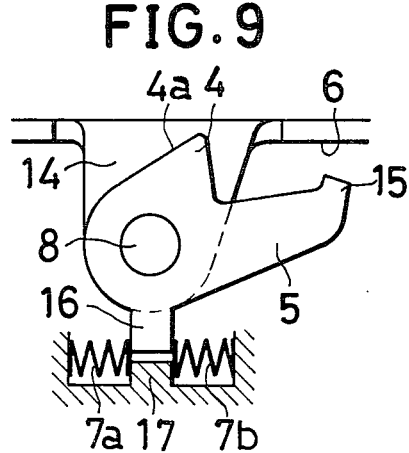
FIG. 9 is a top plan view of another modification.

FIGS. 4 to 7 show the construction of an embodiment of the invention which is contained in the lower portion of a transmission casing of a FF type motorcar that is positioned laterally in relation to the driving direction of the car, and a shift lever 1 is so provided that, as shown in FIG. 4, for instance, the lever 1 may be operated for selection from an intermediate neutral position to first and second selection positions on the left and the right, and then be operated in the first selection position, front and back, between first speed and second speed positions, in the neutral position between third and the fourth speed positions, and in the second selection position between the fifth speed and the reverse gear positions, respectively.

A shift shaft 9 is connected to the shift lever 1 and is contained in the transmission casing, and the shift shaft 9 is connected to undergo a turning movement by the selection operation of the shift lever 1 and a sliding movement in the forward and rearward directions by the shift operation of the lever 1. The shaft 9 imparts to a shift arm 13 of a shift unit 12, a sliding movement upwardly and downwardly according to the selection operation and a swinging movement forwardly and rearwardly according to the shift operation. The shaft 9 is connected to the shift unit 12 by a shift arm 10 and the shift unit 12 is connected to a shift fork 11.

As shown in detail in FIGS. 5 and 6, a projection 3 projects from the lower surface of the shift arm 13, and is adapted to move upwardly and downwardly during a selection operation and forwardly and rearwardly in a shift operation.

Up to this point, the construction is not especially different from that in the conventional apparatus.

According to this invention, the lock member 5 is positioned to project in the path of travel of projection 3 in the lowermost position as shown in FIG. 6, in which the projection 3 travels between forward fifth speed and reverse. The lock member 5 is supported in a horizontal position on a vertical pivot 8 which extends substantially parallel to the travel of the projection 3 during the selection operation of the lever 1 and consequently, the apparatus can become much shorter in its vertical dimension as compared to the foregoing conventional apparatus wherein the lock member is pivotally supported in a vertical position.

If the projection 3 is lowered by selection operation of the shift lever 1 (to the right in FIG. 4) to the second selection position, a cam surface 3a formed on the bottom edge of projection 3 as an inclined surface is brought into contact with a cam edge 4a formed on the outer edge of the engaging claw 4 of the lock member 5 positioned in the neutral position as shown in FIG. 7a, and thereby, the lock member 5 is pivoted to the inoperative position towards the forward gear side, that is, toward the right side as shown in FIG. 7c. A machine frame 14 rotatably supports the pivot 8 of the lock member 5, and an upright stop 6 faces a positioning projection 15 of the lock member 5 and is formed integrally with the machine frame 14. The arrangement is such that, after the projection 3 is moved with the shift lever to the forward gear position (to the right in FIG. 7c) and the shift lever is moved towards the reverse position, the projection 3 engages the claw 4 and the lock member 5 is pivoted counter-clockwise so that the projection 15 abuts the stop 6 and thereby the lock member 5 is in its lock position as shown in FIG. 7b.

The return spring 7 for the lock member 5 is composed of a coil spring disposed around the pivot 8 of the lock member 5, and both end portions of spring 7 are in pressure contact with both side surfaces of a projection 16 formed on the lock member 5 and with both side surfaces of a spring receiving member 17 formed on the machine casing 14, when the lock member 5 is at the neutral position as shown in FIG. 7a. Consequently, if the lock member 5 is pivoted from its neutral position in either direction, the resilient force of the return spring 7 acts on the lock member 5 through that end portion of the spring 7 which is in engagement with the side edge on the turning directional side of the projection 16, and thereby the lock member 5 is given a return movement and is returned reliably to the predetermined neutral position at which time that end portion of the spring 7 again comes into pressure contact with the spring receiving member 17 and the resilient force thereof is received by the member 17.

The return spring may be constructed as a leaf spring 7', as shown in FIG. 8, wherein both end portions of the spring are in pressure contact with both side surfaces of the projection 16 and the spring receiving member 17.

Additionally, as shown in FIG. 9, the return spring may be constructed of a pair of spring elements 7a, 7b individually in pressure contact with both sides of the projection 16 and both sides of the spring receiving member 17, so that the lock member 5 can be given a return movement to its neutral position by the action of a compression force of either spring element as caused by pivotal movement in either direction of the lock member 5 from its neutral position.

Figure 10A:
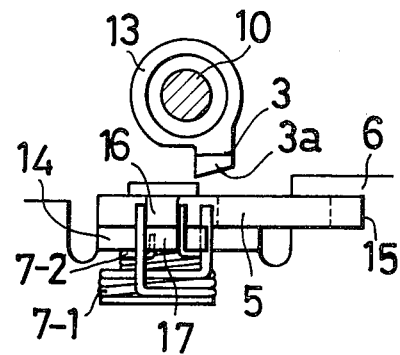
FIGS. 10a and 10b are a side view and a top plan view respectively of a further modification.
Figure 10B:
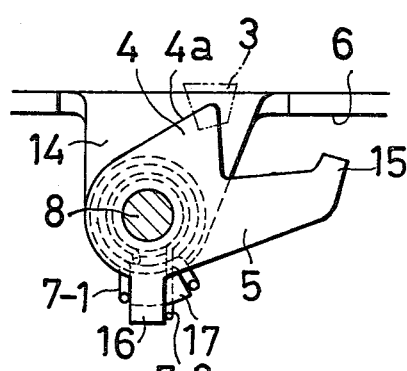

In another embodiment, the return spring may be composed of first and second springs 7-1, 7-2 of different strength as shown in FIGS. 10a and 10b. Namely, the first and the second springs 7-1, 7-2 are composed of large diametrical and small diametrical coils which are in engagement at one of their ends with the spring receiving member 17 projecting from the machine frame 14 itself, and the other operational ends of the springs 7-1 and 7-2 are in pressure contact with respective side surfaces of the projection 16 projecting from the lock member 5, so that the lock member 5 is subjected to a comparatively large resilient force by the first spring 7-1 in the counter-clockwise direction and to a comparatively small resilient force by the second spring 7-2 in the clockwise direction.

Consequently, the lock member 5 can be kept reliably in its neutral position because, at the neutral position of the lock member 5, the operational end of the first spring 7-1 is received by one side surface of the spring receiving member 17 and thereby a pivotal movement of the lock member 5 in the counter-clockwise direction by the first spring 7-1 is prevented, and at the same time a pivotal movement thereof in the clockwise direction by the second spring 7-2 is prevented by the first spring 7-1.

Figure 11:
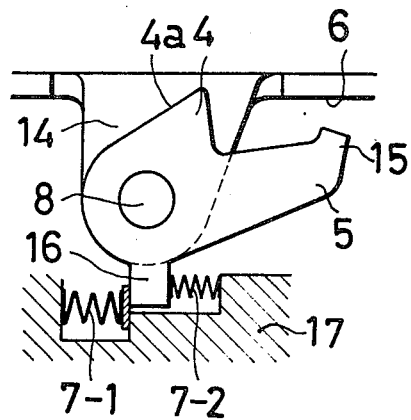
FIG. 11 is a top plan view of another modification.
Figure 14A:
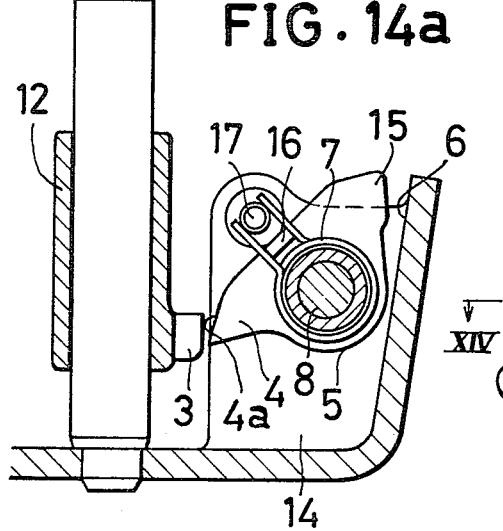
Figure 13:
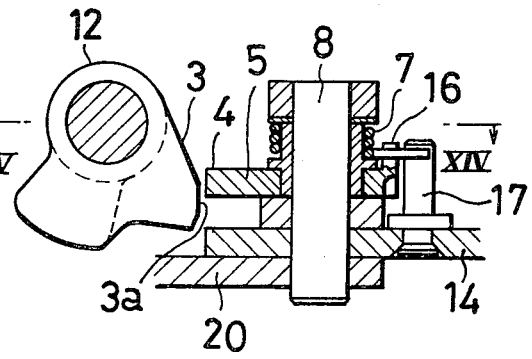
FIG. 13 is a sectional view taken through the embodiment of FIG. 12.

Furthermore, the first and the second springs 7-1, 7-2 may be composed of compression coil springs which are in pressure contact with both sides of the projection 16 of the lock member 5 as shown, for instance, in FIG. 11.

The operation of the apparatus will be described as follows.

If the shift lever 1 is operated for selection from its neutral position to the second selection position (to the right in FIG. 4), the projection 3 moves downwards, and thereby the lock member 5 is pivoted to the inoperative position shown in FIG. 7c, and consequently, forward or rearward movement of the projection 3 during the shift operation from the neutral position to the fifth forward gear position or to the reverse gear position is permitted. If the projection 3 moves rearwards and comes off the engaging claw 4 of the lock member 5 by the shift operation to the fifth forward gear position, the lock member 5 is returned by the return spring 7 to the neutral position in FIG. 7a, so that the lock member 5 is brought into engagement at its engaging claw 4 with the projection 3 at the time of the return operation from the fifth gear position. The shift operation to the reverse gear position is prevented by the further pivotal movement of the lock member 5 to the lock position shown in FIG. 7b.

FIGS. 12, 13 and 14a–14c show another embodiment of this invention. The shift unit 12 connected to the shift fork 11 is supported so as to slide to the right and the left in accordance with sliding movement of shaft 9 during a shifting operation of the shift lever 1 and to undergo a turning movement in accordance with a turning movement of the shift shaft 9 caused by the selection operation of the shift lever 1. The turning movement of the shift unit 12 is effected through a pair of swingable frames 18 and 19 and the sliding movement of the shift piece is effected by a swingable member 20. The projection 3 projecting from a side surface of the shift unit 12 is moved upwardly and downwardly during the selection operation and right and left during the shift operation. In almost the same manner as in the previous embodiment, the lock member 5 is pivotally supported in a horizontal position by the vertical pivot 8 which extends substantially parallel to the direction of travel of projection 3 during the selection operation, and the engaging claw 4 formed at the outer end of lock member 5 is disposed to fall in the path of travel of projection 3 in shifting between fifth forward speed and reverse. Thus, if the projection 3 is moved upwards by a selection operation of the shift lever to the second selection position, the cam surface 3a formed on its top portion is brought into engagement with the cam surface 4a formed on the outer edge of the engaging claw 4, and the lock member 5 is pivoted to the inoperative position shown in FIG. 14c. In the course of a return operation of the shift lever from the fifth gear position, the projection 3 is brought into engagement with the engaging claw 4 and the lock member 5 is pivoted to the lock position shown in FIG. 14b, so that an incorrect operation to the reverse gear position can be prevented in almost the same manner as above.

Thus, according to this invention, the projection 3 is provided at its top portion with the cam surface 3a, and the lock member 5 is arranged to be positioned in the path of travel of the selection operation of the projection 3 at right angles therewith and be pivoted to the inoperative position by the selection operation of the shift lever, so that, without adversely affecting the operation of the lock member 5, the apparatus can be small-sized in the direction of the selection operation while eliminating the deficiencies in the conventional apparatus.

According to the second feature of this invention, the return spring 7, in the neutral position of the lock member 5, is in pressure contact with both sides of the projection 16 formed on the lock member 5 and with both sides of the spring receiving member 17 formed on the machine frame 14, so that even when there occurs a slight inclination of the lock member 5 from its neutral position, the resilient force of the return spring 7 acts on the projection 16, so that the lock member 5 can be reliably returned to its predetermined neutral position at which the resilient force is received by the receiving member 17.

According to the third feature of this invention, the lock member 5 is urged in one direction of pivotal movement by the first spring 7-1 which is comparatively strong and in the other direction of pivotal movement by the second spring 7-2 which is comparatively weak, the resilient force of the first spring 7-1 being received by the spring receiving member 17 provided on the machine frame 14, so that the lock member 5 can be reliably returned to its neutral position and the disadvantages in the conventional construction are overcome.

What is claimed is:

1. In a shifting apparatus for a transmission of a vehicle having a shift lever operable left and right for travel to selection positions and front and rear for shifting gears, the shift lever being shiftable in one of the selection positions between a forward gear position and reverse position, projection means movable with said shift lever, a pivotal lock member positioned in the path of travel of the projection means in moving to said one selection position such that the lock member is pivoted from a neutral position to an inoperative position in which the shift lever is movable to said forward gear and reverse positions, spring means engaging said pivotal lock member for urging said lock member to said neutral position and opposing pivotal movement therefrom, said lock member including a claw which is positioned to engage said projection means when the shift lever has traveled to said forward gear position and is then moved towards said reverse gear position whereby said lock member then pivotably moves with the travel of said projection means, and stop means for limiting the pivotal movement of the lock member and preventing travel of the projection means and thereby of said shift lever to said reverse position, the improvement comprising pivot means supporting said lock member for pivotal movement about an axis extending parallel to the direction of travel of the projection means when the shift lever is moved in the selection direction, said projection means and lock member having opposed cam surfaces cooperatively engageable when the projection means contacts the lock member when the shift lever moves to said one selection position to pivot said lock member from said neutral position to said inoperative position.

2. The improvement as claimed in claim 1 wherein said cam surfaces on said projection means and said lock member are inclined with respect to one another.

3. The improvement as claimed in claim 2 wherein said projection means travels vertically and said lock member is supported by said pivot means in horizontal attitude.

4. The improvement as claimed in claim 3 wherein said cam surfaces are respectively shaped to produce horizontal pivotal movement of said lock member as said projection means travels vertically.

5. The improvement as claimed in claim 3 wherein said cam surface of said lock member is disposed in a plane inclined with respect to the vertical.

6. The improvement as claimed in claim 5 wherein said projection means comprises a downwardly extending projection, said cam surface on said projection means being an inclined surface on the lower edge of said projection.

7. The improvement as claimed in claim 6 wherein said cam surface on said lock member is on an outer edge surface of said claw.

8. The improvement as claimed in claim 1 wherein said lock member includes a projection having opposite sides and the shifting apparatus comprises a fixed receiving member having opposite sides, said spring means being in pressure contact with both sides of said projection on the lock member and both sides of the fixed receiving member in said neutral position of the lock member.

9. The improvement as claimed in claim 8 wherein said spring means comprises two spring elements of different strengths.

10. The improvement as claimed in claim 8 wherein said spring means comprises a leaf spring having ends each respectively engaged with one of the sides of the receiving member and the projection on the lock member.

* * * * *